(12) United States Patent
Sahu et al.

(10) Patent No.: US 11,907,811 B2
(45) Date of Patent: Feb. 20, 2024

(54) OPTICAL RESERVOIR COMPUTING SYSTEM AND METHOD OF USING THE SAME

(71) Applicant: Science Cadets, Inc., San Jose, CA (US)

(72) Inventors: Anwesh Patnaik Sahu, San Jose, CA (US); Saroj Kumar Sahu, San Jose, CA (US)

(73) Assignee: SCIENCE CADETS, INC., San Jose, CA (US)

( * ) Notice: Subject to any disclaimer, the term of this patent is extended or adjusted under 35 U.S.C. 154(b) by 1244 days.

(21) Appl. No.: 16/522,547

(22) Filed: Jul. 25, 2019

(65) Prior Publication Data
US 2021/0027192 A1 Jan. 28, 2021

(51) Int. Cl.
| | | |
|---|---|---|
| *G06N 20/00* | (2019.01) | |
| *G06E 3/00* | (2006.01) | |
| *G06N 3/067* | (2006.01) | |
| *G06N 3/044* | (2023.01) | |

(52) U.S. Cl.
CPC ............ *G06N 20/00* (2019.01); *G06E 3/005* (2013.01); *G06N 3/044* (2023.01); *G06N 3/0675* (2013.01)

(58) Field of Classification Search
CPC ...... G06N 20/00; G06N 3/044; G06N 3/0675; G06R 3/005
USPC .......................................................... 359/245
See application file for complete search history.

(56) References Cited

U.S. PATENT DOCUMENTS

| | | |
|---|---|---|
| 9,568,623 B2 | 2/2017 | Sahu et al. |
| 2016/0139280 A1 | 5/2016 | Sahu et al. |

OTHER PUBLICATIONS

"Advances in photonic reservoir computing", Guy Van der Sande, et al., Nanophotonics 2017; 6(3): 561-576, DOI 10.1515/nanoph-2016-0132.

"Reservoir computing using dynamic memristors for temporal information processing", Du et al., Nature Communications | 8: 2204 | DOI: 10.1038/s41467-017-02337-y.

"Recent Advances in Physical Reservoir Computing: A Review", Tanaka et al., Preprint submitted to Neural Networks, Dec. 20, 2018, arXiv:1808.04962v2 [cs.ET] Dec. 19, 2018.

(Continued)

*Primary Examiner* — Joseph P Martinez
*Assistant Examiner* — Grant A Gagnon
(74) *Attorney, Agent, or Firm* — Chen-Chi Lin

(57) ABSTRACT

An optical reservoir computing (ORC) system has a near-UV light emitting diode modulator (LED-M), a beam expander (BE), a fluorescer array (FA), an optical integrator (OA), a liquid crystal spatial light modulator (LC-SLM), and a photo-detector array (PDA). The LED-M receives an input electrical signal and outputs an optical signal passing through the BE, being made incident upon the FA, being processed in the OA, and being multiplexed onto the LC-SLM. "Non-Linearity" is introduced by overlapping responses to input signals by the FA. "High Dimensionality" is provided by the random but fixed time-wavelength multiplexing onto an imaging plane by a Fresnel-Kohler Integrator (FKI). "Fading Memory" is provided by different decay time constants of the fluorescers. A method of using the ORC system comprises the steps of minimizing an error function of difference between a measured state of the PDA and a target state of the PDA by a regression model.

21 Claims, 7 Drawing Sheets

(56) References Cited

OTHER PUBLICATIONS

"Recent trends in concentrated photovoltaics concentrators' architecture", Marina Buljan et al., Journal of Photonics for Energy, 040995-1, vol. 4, 2014.

"Differences in the behavior of dicationic and monocationic ionic liquids as revealed by time resolved-fluorescence, NMR and fluorescence correlation spectroscopy", Debashis Majhi et al., Phys. Chem.Chem.Phys., 2018, 20, 7844, DOI: 10.1039/C7CP08630J.

"Modelling Laser-Diode Non-linearity in a Radio-over-Fibre Link", G. Baghersalimi, et al., Pre-print, Research Gate, 2003.

580

| $T_3$ $T_3$ $T_1$ | $T_{12}$ $T_{12}$ | $T_{16}$ $T_5$ $T_{12}$ |
|---|---|---|
| $T_1$ $T_3$ | $T_1$ $T_{12}$ | $T_{16}$ $T_1$ $T_9$ $T_5$ |
| $T_{16}$ $T_5$ $T_5$ | $T_9$ $T_{16}$ $T_9$ | $T_3$ $T_9$ |

FIG. 5

OPTICAL RESERVOIR COMPUTING SYSTEM AND METHOD OF USING THE SAME

CROSS-REFERENCE TO RELATED APPLICATIONS

The disclosure made in the US Patent Application Publication No. 2016/0139280 to Sahu, et al, issued as U.S. Pat. No. 9,568,623; and the disclosure made in the publication entitled "Reservoir computing using dynamic memristors for temporal information processing" to Du et al., NATURE COMMUNICATIONS|8, Article number: 2204 (2017) |DOI: 10.1038/s41467-017-02337-y, (hereafter, "Du") are hereby incorporated by reference.

FIELD OF THE INVENTION

This invention relates generally to an optical reservoir computing (ORC) system and a method of using the ORC system. More particularly, the present invention relates to an ORC system with high dimensionality (HD), non-linearity (NL), fading memory (FM), and separation property (SP).
Introduction:
Machine Learning/Artificial Intelligence (ML/AI) algorithms using modern hardware and programming languages have been advancing rapidly during last decade. The hardware is almost exclusively built on semiconductor microprocessors. Current state-of-the-art (SoA) machine learning algorithms, such as Deep Neural Networks (DNNs) are implemented on high performance semiconductor microprocessor clusters comprising central processing units (CPUs), graphics processing units (GPUs) and specialized digital accelerators, for example, tensor processing units (TPUs).

Those high performance semiconductor microprocessor clusters follow the von Neumann architecture of computing, and have become powerful in terms of processing speed over the past decades, with reducing transistor size. ML/AI experts have taken advantage of this power to invent and implement new computational workloads for cognitive data analysis. The algorithms and the von Neumann implementations have now become increasingly important and ubiquitous. However, it has been recognized that doing more complex cognitive tasks with von Neumann architecture requires increasing number of processors, energy and cost. It has been contemplated that the cognitive workloads may work far more efficiently in some architectures outside of von Neumann. Human brain, for example, is a non-von Neumann machine that processes cognitive problems (for example, face recognition) far faster than a von Neumann machine using far less energy.

ML/AI algorithms, for example, DNNs, serving cognitive workloads can be mapped into non-von Neumann system architectures. The non-von Neumann architectures have been implemented in different fields of science and mathematics under the names such as "Reservoir computing", "Echo State Networks", "Recurrent Neural Network", and "Liquid State Network". The non-von Neumann architectures are generally implemented with inherent memory, dimensional expansion, and subsequent integration with feedback.

Reservoir computing (RC) is an example of a Recurrent Neural Network for dynamic data analysis, which has been implemented into traditional semiconductor hardware in the electrical domain still using von Neumann architecture for fundamental computing. A big step forward in this direction is to use the optical domain for RC, which may fundamentally use a non-von Neumann processing. The hardware methods are called Optical Reservoir Computing (ORC).

Generally, an ORC system uses bulk optical and electro-optical components for delayed-feedback systems to realize reservoirs with several hundreds or thousands of nodes. The advantages of an ORC relative to an RC in electrical domain are:
  a. Processing at the nodes is done at optical speeds from nano-seconds down to even femto-seconds.
  b. Energy consumed for a given cognitive problem is several orders of magnitude lower.

This present disclosure discloses a type of ORC system.

BACKGROUND OF THE INVENTION

Reservoir computing (RC) is a framework for computation that may be viewed as an extension of neural networks. Typically an input signal is fed into a fixed (random) dynamical system called a reservoir and the dynamics of the reservoir map the input to a higher dimension. Then a simple readout mechanism is trained to read the state of the reservoir and map it to the desired output. The main benefit is that training is performed only at the readout stage and the reservoir is fixed. RC is synonymous with Liquid-State Machines (LSM) and Echo State Networks (ESN), terms also widely used in the field.

In an electrical domain, RC has been demonstrated successfully using memristors by "Du". A preview of RC in several physical domains, including optical domain, namely, Optical Reservoir Computing (ORC) is provided in "Tanaka". In ORC, high dimensionality (HD) is usually provided with diffraction. However, HD with higher diffractive orders has progressively lower intensity, necessitating costly and complex intensity-balancing and optical amplification for spatial cross-coupling of nodes. Non-linearity (NL) is usually enabled by driving optical amplifiers to saturation. This requires much power, besides optical amplifiers being expensive to build. Fading Memory (FM) is usually made possible with looped optical fibers or waveguides, which requires much space. When such waveguides are built in compact area, signals are very lossy, and require additional power-hungry optical amplifiers.

In the present disclosure for an ORC, HD is provided by the random but fixed time-wavelength multiplexing on to an XY plane by a Fresnel-Kohler Integrator (FKI). NL is introduced by overlapping non-linear responses to input signals by an array of fluorescers. FM is provided by different decay time constants of elements of the array of fluorescers.

FIG. 4 of "Du" shows handwritten digit recognition using a memristor-based RC system. The ORC system of the present disclosure can be applied for many pattern recognition problems, including handwritten digit recognition, handwritten alphabet recognition, handwritten Chinese character recognition, or WIFI network recognition.

SUMMARY OF THE INVENTION

The present invention discloses an ORC system comprising a Light Emitting Diode Modulator (LED-M), a Beam Expander (BE), a Fluorescer Array (FA), a Fresnel-Kohler Integrator (FKI), a Liquid Crystal Spatial Light Modulator (LC-SLM), and a Photo-Detector Array (PDA), and PDA signal processing electronics which may include a Field Programmable Gate Array (FPGA) and a logic controller. The LED-M receives an input electrical signal and outputs an optical signal. The optical signal passes through the BE, is made incident upon the FA, is processed in the FKI, and is multiplexed onto the LC-SLM. The LC-SLM, the PDA a Field-Programmable Gate Array (FPGA), and a logic controller form a feedback loop. A method of using the optical reservoir computing system is disclosed. The method comprises the steps of minimizing an error function of difference between a measured state of the PDA and a target state of the PDA by a regression model; and tuning different combinations of the LC-SLM states.

BRIEF DESCRIPTION OF THE DRAWINGS

FIG. 5 is a partial view of a time constant and composition of light falling on a liquid crystal spatial light modulator (LC-SLM) in examples of the present disclosure.

DETAILED DESCRIPTION OF THE INVENTION

Figure 1:
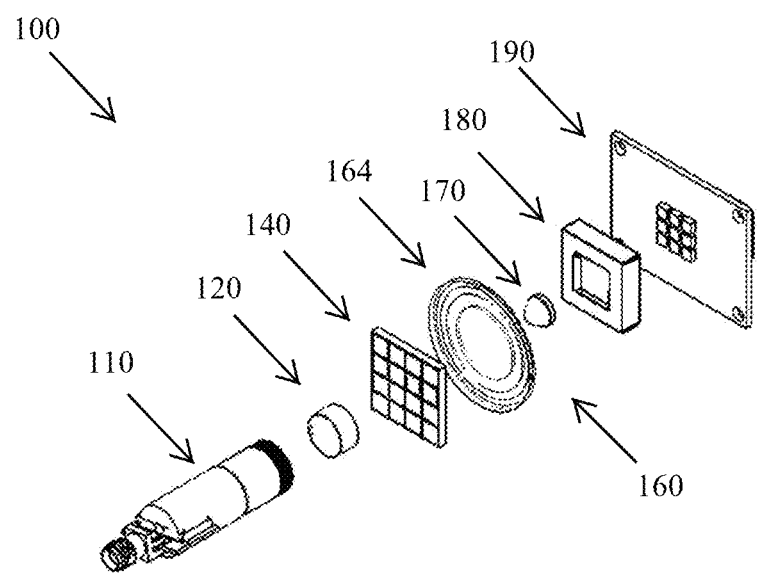
FIG. 1 is a perspective view of an optical reservoir computing (ORC) system in examples of the present disclosure.

FIG. 1 is a perspective view of an Optical Reservoir Computing (ORC) system 100 in examples of the present disclosure. The ORC system 100 comprises a Light Emitting Diode Modulator (LED-M) 110, a Beam Expander (BE) 120, a Fluorescer Array (FA) 140, a Fresnel-Kohler Integrator (FKI) 160 comprising a Fresnel lens 164 and an aspheric lens concentrator 170, a Liquid Crystal Spatial Light Modulator (LC-SLM) 180, and a Photo-Detector Array (PDA) 190. In examples of the present disclosure, the LED-M 110, the BE 120, the FA 140, the Fresnel lens 164 of the FKI 160, the concentrator 170 of the FKI 160, the LC-SLM 180, and the PDA 190 are aligned along a predetermined direction.

An optical signal from the LED-M 110 passes through the BE 120, is made incident upon the FA 140, is processed in the FKI 160, and is multiplexed onto the LC-SLM 180, which selectively masks the incoming light and illuminates the PDA 190.

Figure 2:
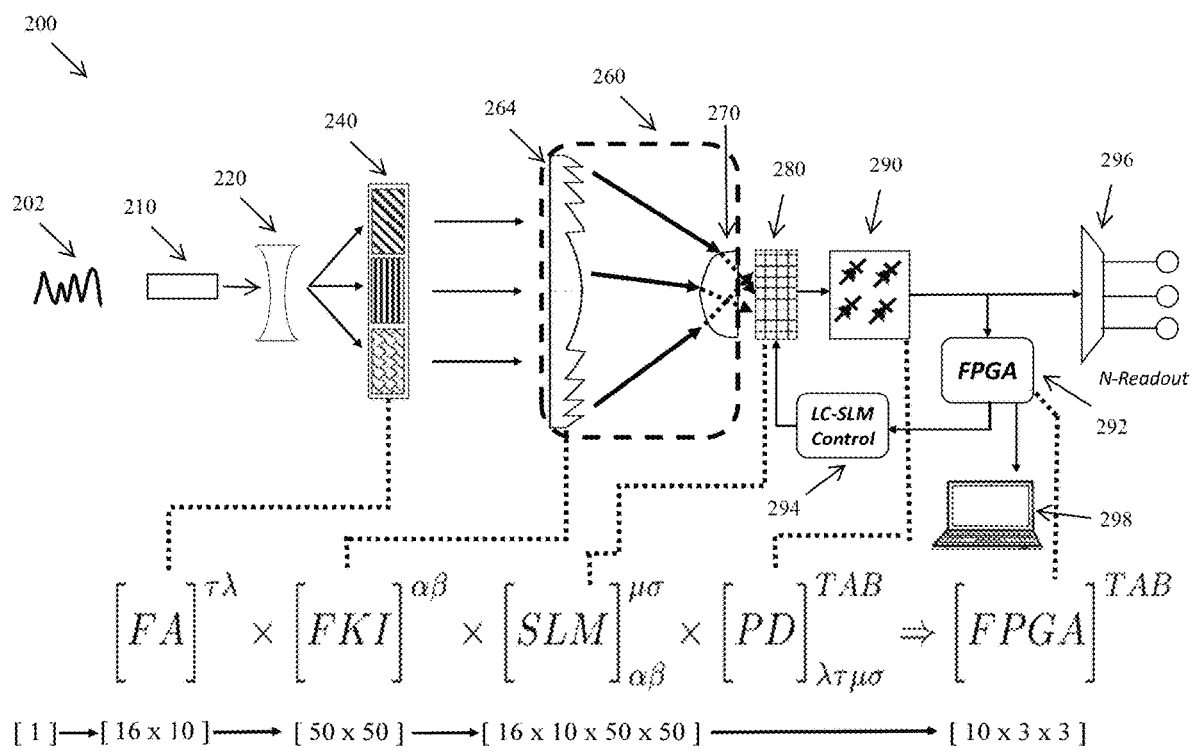
FIG. 2 is a schematic plot of an optical reservoir computing (ORC) system in examples of the present disclosure.

FIG. 2 is a schematic plot of an ORC system 200 in examples of the present disclosure. The optical reservoir computing system 200 comprises an LED-M 210, a BE 220, an FA 240, an FKI 260 comprising a Fresnel lens 264 and a concentrator 270, an LC-SLM 280, a PDA 290, an FPGA 292, a logic controller 294, and a plurality of read-out channels 296 connected to the PDA 290.

An optical signal from the LED-M 210 passes through the BE 220, is made incident upon the FA 240, is processed in the FKI 260, and is multiplexed onto the LC-SLM 280. In examples of the present disclosure, the LC-SLM 280, the PDA 290, the FPGA 292, and the controller 294 form a feedback loop. The elements of LC-SLM 280 are tuned to have different attenuations based on the learning from analysis of PDA 290 signals by FPGA 292.

In examples of the present disclosure, the input signal 202 to the LED-M 210 is an electronic signal, representing the cognitive data that needs to be processed. The data may be fed at any frequency of interest, but specifically in the range from 1 kHz to 10 GHz. The processing can be done in real time (such as WiFi signature detection) or off-line (such as face recognition from photographs). The LED-M 210 comprises a near-ultraviolet photodiode, with wavelength of emission between 200 and 450 nm. The electronic signal modulates the near-ultraviolet photodiode so as to generate the optical signal, thus achieving the electro-optic conversion, so that the reservoir computing can now happen in the optical domain.

In examples of the present disclosure, the optical integrator 260 is an FKI. The PDA 290 includes photodiodes, and electronics for amplification, shaping and discrimination of the optical signal. The FPGA 292 outputs data to an external data processing and controlling device 298, which may be a computer. The FPGA 292 also controls the pixels of the LC-SLM which does a fixed or programmable masking of FKI 260 output before it goes to PDA 290.

In examples of the present disclosure, the optical signal from LED-M is a modulated light beam with a wavelength in a range from 200 nm to 450 nm. The input electronic signal for cognitive processing is converted to the near-ultraviolet optical signal with the LED-M 210. In examples of the present disclosure, the LED-M 210 includes a 280 nm LED (for example, XR-280 from RAYVIO Corporation) and a high-speed LED driver (for example, ONET4201LD from TEXAS INSTRUMENTS Incorporated). In examples of the present disclosure, the optical signal is a non-linear function of the input electrical signal, for example, see "Modeling Laser-Diode Non-linearity in a Radio-over-Fibre Link", Pre-print, Research Gate, 2003, by Baghersalimi et al. This electro-optic conversion is non-linear, which contributes to the non-linearity (NL) of signal transformation required for Reservoir Computing.

Figure 3:
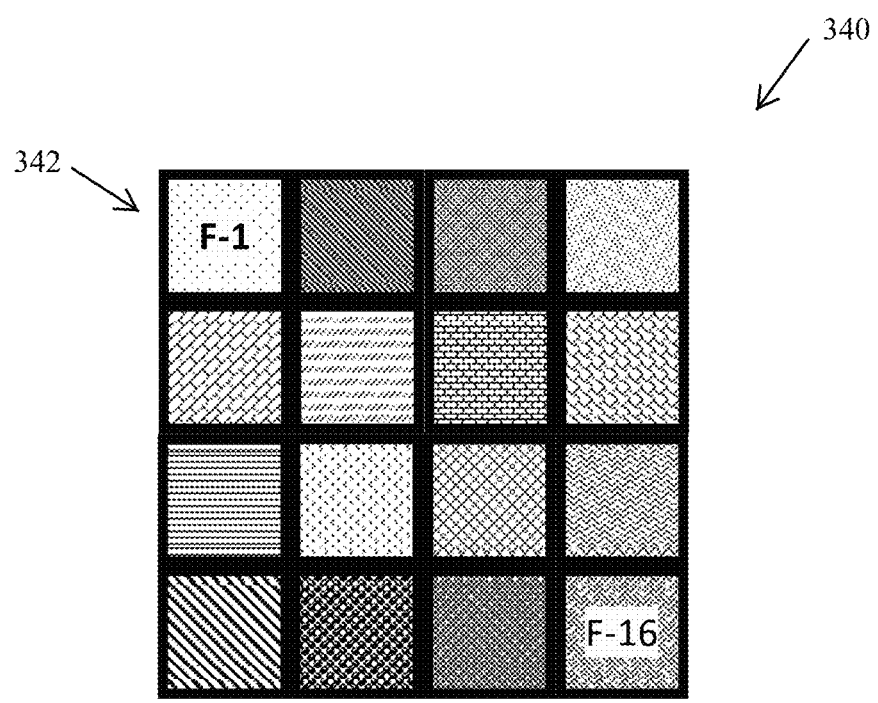
FIG. 3 is a fluorescer array (FA) with sixteen different elements in examples of the present disclosure.

FIG. 3 is a fluorescer array 340 with sixteen different elements 342 in examples of the present disclosure. The light signal from LED-M 210 is expanded with a quartz concave BE 220 (for example, Lens #48-054 from EDMUND OPTICS Inc.) to 1 cm in diameter. The expanded UV light is made incident on the fluorescer array 240 of FIG. 2. The elements 342 of the fluorescer array 340 are chosen such that each of the elements 342 has a different fluorescence time constant and different emission spectrum. Each fluorescer unit of the FA 240 is characterized by a distinct emission characteristic with a spectral bandwidth in a range from 10 nm to 400 nm and a decay time in a range from 1 nano-second to 10 milli-second. In one example, a size of the fluorescer array 340 is 2 cm×2 cm×0.5 mm with 16 different elements.

A modern technique to create and tune elements of the FA is to dissolve a strong fluorescer in a relaxation ionic liquid (see U.S. Pat. No. 9,568,623) to obtain the desired temporal and spectral behavior. For example, from FIG. 6 of "Differences in the behavior of dicationic and monocationic ionic liquids as revealed by time resolved-fluorescence, NMR and fluorescence correlation spectroscopy", Physical Chemistry Chemical Physics, February 2018, by Majhi et al, a time constant of fluorescence emission time-resolved intensity is in a range from several nano-seconds to more than 10 milli-seconds. In the present disclosure, fluorescers and solvents are mixed in pre-determined ratios to tune the tuning is applied to get different time constants and spectral emission. Fluorescers, solvents of interest are commercially available from SIGMA-ALDRICH Inc, for instance. Ionic liquids of interest are commercially available from IOLITEC Inc., for instance.

In examples of the present disclosure, fluorescer compounds can be selected to have emission time constants starting from nano-seconds to sub-seconds, thus making this architecture suitable not just for RF signals (ns resolution), but also for audio (micro-sec) and seismic (milli-sec) signals.

Figures 4A, 4B:
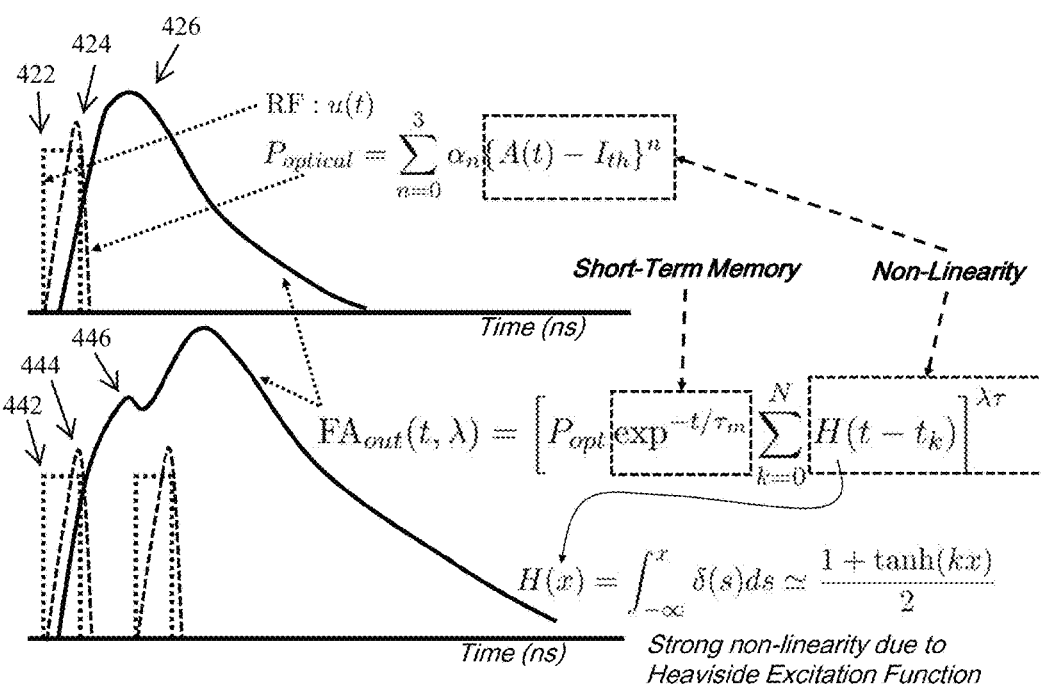
FIGS. 4A and 4B show outputs of a fluorescer array (FA) in examples of the present disclosure.

Conversion of electrical to optical signal through LED-M 210 and FA 240 is mathematically depicted in FIGS. 4A and 4B. In FIG. 4A, a single pulse electrical signal 422 (in dotted lines) results in LED-M optical output 424 (in dashed lines), and fluorescent light output 426 (in solid line) of one element of the FA. In FIG. 4B, a dual pulse RF signal 442 (in dotted lines) results in LED optical output 444 (in dashed lines), and fluorescent light output 446 (in solid line) of one element of the FA 240. The input electrical signal 422, in this example, in RF domain, is u(t). This transforms to the optical signal through the LED-M 210 to a form:

$$P_{opt} = \Sigma_{n=0}^{3} \alpha_n \{A(t) - T_{th}\}^n \quad (1)$$

Where A(t) is the amplitude function of the input electrical signal u(t), $I_{th}$ is the threshold current of the LED-M, and $\alpha_n$ are the coefficients of electro-optic modulation, which are empirical constants for the LED-M type.

When this optical signal $P_{opt}$ 424 from LED-M 210 is expanded with the BE 220 and made incident on the FA 240, each of the FA 240's elements fluoresce differently in response. The response function of a single element of FA 240, $FA_{out}$ is generally described as a function of time t and wavelength band λ:

$$FA_{out}(t,\lambda) = P_{opt} \cdot e^{-t/\tau(\lambda)} \cdot \Sigma_{p=0}^{N} H(t-t_p) \quad (2)$$

where τ(λ) is the fluorescence decay time constant for wavelength band λ, N is the number of incoming signal pulses, p is the index of the pulse in the sequence of pulses, $t_p$ is the time at which the p'th pulse was generated. The Heaviside function H is defined as:

$$H(x) = \int_{-\infty}^{x} \delta(s) ds \cong \frac{1 + \tanh(kx)}{2} \quad (3)$$

where k is known as the logistic factor.

The exponential term $e^{-t/\tau(\lambda)}$ provides the Fading Memory (FM) and the Heaviside function $\Sigma_{p=0}^{N} H(t-t_p)$ provides the Non-Linearity (NL). The sequence of the input signal (one-dimensional) is now encoded in both, time and wavelength. The tensor that describes the fluorescer array (FA) 240 is $[FA]^{\tau\lambda}$, as shown in FIG. 2. In the current implementation, 16 such optical signals are coming out of the FA 240.

All the 16 time-wavelength emission outputs are made incident on the Fresnel-Kohler Integrator (FKI), one example of integrator 260, in FIG. 2. Methods of designing FKI's are described in "Recent trends in concentrated photovoltaics concentrators' architecture", Journal of Photonics for Energy 040995-1 Vol. 4, 2014, by Marina Buljan et al. A distant variant of FKI, called Kohler Integrator (without the "Fresnel") has been used in an optical RC architecture, see "Reconfigurable semiconductor laser networks based on diffractive coupling", Optics Letters, 2015; 40:3854, by Brunner D et al. FKI's are used in solar illumination concentrators. In present disclosure, the FKI comprises a Fresnel lens 264 of FIG. 2 followed by an aspheric lens (the concentrator 270 of FIG. 2). Fresnel lenses are commercially available (for example, LFG2233 from KNIGHT OPTICAL Ltd.). The aspheric lens is custom designed with an optical design software (for example, ZEMAX EUROPE, Ltd.) and is tuned by a lens-maker (for example, DORIC LENSES Inc.) from the closest variant in stock.

Due to the spectral dispersion of the Fresnel lens and convergence by the aspheric lens, the FKI 260 system as a whole creates a near-uniform illumination on the target plane (αβ) by coupling all the input sources in spectral (λ) and temporal (τ) dimensions in a non-linear, complex, but fixed manner. The tensor that describes the FKI 260 is $[FKI]^{\alpha\beta}$, as shown in FIG. 2. Together, FA 240 and FKI 260 provide a 4-fold dimensional expansion, from τ to τλαβ, thus achieving HD, another requirement for RC.

FKI 260 images the signal on to the LC-SLM 280 of FIG. 2 set up in a transmission mode. The LC-SLM 280 is commercially available (for example, LC2012 from HOLO-EYE PHOTONICS AG). It is essentially an array of pixels of liquid crystal that change the transmittivity in response to a voltage. Commercial LC-SLMs are available in pixel arrays larger than 1000×700, for instance. For convenience, and depending on the needs of the application, several of pixels are electrically operated in parallel—so that they behave as a single unit, called a "segment". A partial view of the nature of the light falling on the LC-SLM 280 is shown in FIGS. 2 and 5. In this implementation the LC-SLM 280 is configured to be a segment array of 3×3 individually controllable attenuation. Each segment receives beams from multiple fluorescers having multiple time and wavelength signatures with different intensities. In FIG. 5, the imaging plane 580 of the FKI 260 is described. The imaging plane 580 is the input to the LC-SLM 280, and has 3×3 segments. Each segment receives optical signal from different elements of the FA 240 having gone through a space-wavelength transformation through the FKI 260. The transformation is random, but fixed for the same stream of input electrical signal 202. For instance, the first segment of plane 580 receives light of two different wavelengths with respective fluorescence decay time constants from $3^{rd}$ fluorescer element of FA 240 and one wavelength with a fluorescence decay time constant from $1^{st}$ fluorescer element of FA 240. ($\tau_3$, $\tau_3$, $\tau_1$). In another instance, the third segment of plane 580 receives light of three different wavelengths with respective fluorescence decay time constants from $16^{th}$, $5^{th}$ and $12^{th}$ fluorescer element of FA 240, respectively. ($\tau_{16}$, $\tau_5$, $\tau_{12}$).

Light going through the LC-SLM 280 is made incident upon the PDA 290 of FIG. 2. The PDA 290 comprises the upstream part of the read-out layer. Its multiplicity can be as low as "1" for a "yes or no" detection of input signal or as large as the resolution of the LC-SLM 280. In examples of the present disclosure, a 4×4 PDA 290 matrix (for example, PIN-4×4D from OSI OPTOELECTRONICS Inc.) is used, which already gives $2^{16}$=65536 states for the read-out, which gives sufficient freedom for achieving the Separation Property (SP) for many signature detection and cognitive problems. The PDA 290 electronics includes predetermined shaping, amplification and discrimination (as a squashing function) before passing on to the plurality of read-out channels 296 of FIG. 2. The PDA 290 samples for 100 ns with an effective resolution of 10 ns in this implementation.

A copy of the PDA 290 outputs is fed into an FPGA 292 of FIG. 2, which learns from these signals (as described below) and controls the LC-SLM 280 pixels through a controller (including a control card) 294. This constitutes the configurable weights only on the output nodes—a main feature of RC. The programming and training of the FPGA 292 is done by an external electronic device (a computer)

298 of FIG. 2 attached to it. The input speed of the FPGA 292 needs to be of the order of the time constant of the fluorescers. For instance, in this implementation, the input RF electrical data rate is 1 GHz, and the flurescor time constants are of the order of 10 nano-seconds. Therefore the FPGA 292 operates at 100 MHz or faster with at least 9 fast digital inputs and several digital outputs. In examples of the present disclosure, the commercial FPGA Artix-7 from XILINX Inc. is used, which is available on a development board as part no. EK-A7-AC701-G.

The dimensional expansion of information and squashing works in the following manner and depicted in FIG. 2. The dimensionality of the input electrical signal is 1—time t is the only vector in that dimension and the information content can be described with the matrix [1]. The FA 240 has 16 elements of fluorescers with their own time constants $\tau$. Each of the fluorescers also emit in a band of wavelengths. In this implementation, the average bandwidth of fluorescence is 50 nm, with a resolvable bandwidth of 5 nm by the FKI 260. Hence there is a wavelength vector $\lambda$ that is 10 elements wide. Therefore, the optical signal out of the FA 240 is a 2-dimensional tensor $[FA]^{\tau\lambda}$ with [16×10]=160 elements. This optical signal is wavelength-space multiplexed through the FKI 260. In the current implementation, the spatial resolution of the FKI 260 is [50×50], the two dimensions being noted as $\alpha$, $\beta$. The FKI transformation matrix is therefore denoted as $[FKI]^{\alpha\beta}$ with [50×50]=2500 elements. Therefore, the number of internal nodes of this reservoir is $[FA]^{\tau\lambda} \times [FKI]^{\alpha\beta}$; i.e, [16×10×50×50]=400,000.

The dimensional compression to output nodes and training works in the following manner. Image of the FKI 260 is presented to the imaging plane 580, which is the input surface of the LC-SLM 280. The LC-SLM provides a tunable transformation with attenuation in 2 spatial dimensions, denoted as $\mu$, $\rho$. Since in this implementation there are only 4×4 segments in the LC-SLM 280, the number of elements in dimensions $\mu$, $\rho$ is [4×4]=16. The tensor that describes the transformation through LC-SLM 280 is $[SLM]_{\alpha\beta}^{\mu\sigma}$. A large dimensional compression happens at this stage, since the $\alpha$, $\beta$ information is lost giving rise to the SLM tuning for attenuation. The output nodes are just the segments of the LC-SLM, and their dimensionality is $\mu$, $\sigma$ which is [4×4]=16. There are just 16 output nodes which need to be tuned for training of the ORC without altering the 400,000 internal nodes—a fundamental feature of Reservoir Computing.

The output of the LC-SLM 280 is presented to the PDA 290, which converts the optical signals back into the electrical domain. In this implementation, the PDA 290 is a matrix of 2 dimensions A, B of [3×3]=9 photo-diodes. The spatial information is further compressed from $\mu$, $\sigma$: [4×4] to A, B: [3×3]. Since the photo-detectors are blind to the different wavelengths, the $\lambda$ information is completely collapsed and integrated into the response of photo-detector. The squashing of the nodes, a typical feature of neural nets, can be applied here by under or over-saturating the photo-detector response under desired conditions. The time information $\tau$ is also shaped and integrated to a slower time vector T. The photo-detector transformation tensor is therefore written as $[PD]_{\lambda\tau\mu\sigma}^{TAB}$.

The electrical signal after being further processed in PDA 290 is read by the FPGA 292. The information read by the FPGA has two spatial dimensions—the plurality of PDA elements, namely A, B: [3×3]. It also has a temporal dimension T. In this implementation, the temporal resolution of the FPGA is 10 nano-seconds, processing signals that can be 10-110 nano-seconds wide—therefore the vector T is 10 elements long. The final information matrix from FPGA has a dimensionality of 3: T,A,B: [10×3×3].

In this implementation, the dimensionality expansion and compression is summarized as follows.

$$[FA]^{\tau\lambda} \cdot [FKI]^{\alpha\beta} \cdot [SLM]_{\alpha\beta}^{\mu\sigma} \cdot [PD]_{\lambda\tau\mu\sigma}^{TAB} = [FPGA]^{TAE} \quad (4)$$

This is where the output weights are applied from training. The LC-SLM 280 does a resolution-compression from $\alpha\beta$ to $\mu\sigma$, depicted by the transformation tensor $[SLM]_{\alpha\beta}^{\mu\sigma}$ of FIG. 2. While $\alpha\beta$ is analog and very fine in its resolution to help with HD, $\mu\sigma$ is finite in resolution, and can be programmed to be a predetermined size between 2×2 through 1024×768, for instance, with commercial LC-SLMs. This helps greatly in the learning process as we proceed from just several weights to a large number of weights in order to get the SP, another requirement for the RC.

Training algorithm for this device is rather simple, since the RC is all in optical domain. The input signature is u(t), which gets transcribed on the LC-SLM 280 as X(t,$\lambda$,x",y"). The weights that are applied by virtue of the LC-SLM 280 attenuation are W(x',y'). The PDA 290 outputs constitute the final read-out Y(T,x,y).

Generally, if plurality is defined as P, then: P(x")>> P(x')>P(x) and P(y")>>P(y')>P(y). Also, time scale T>>time scale of t.

The SP property of RC desires that for different u(t), there would be distinct classes of Y(T,x,y). The W are needed to be trained to achieve that. W is recursively trained by minimizing the error function E.

$$E(Y, Y^{target}) = \sum_i \sqrt{\frac{1}{T}\sum_{n=1}^{T}\left(Y_i(n) - Y_i^{target}(n)\right)^2} \quad (5)$$

In this notation, Y is the PDA 290 state and $Y^{target}$ is the desired state when SP is achieved. The training method iterates until SP is achieved.

Regression methods are used to minimize the error function. The methods will regress on the tensor W(x',y'), such that: W(x'y'). X=Y First, simple Linear Regression methods are tried to find W, using regular inverse and Penrose inverse:

$$WX = Y \Rightarrow W = (YX^T)(XX^T)^{-1} \quad (6)$$

$$WX = Y \Rightarrow W = (YX^T)(XX^T)^{+} \quad (7)$$

For better results, Ridge Regression method is used, with a regularization parameter $\lambda$, such that:

$$W = (YX^T)(XX^T + \lambda I)^{-1} \quad (8)$$

Other well-known minimization techniques borrowed from the fields of Echo State Networks and Liquid State Machines can be used if the above methods do not produce the desired result. Training will be deemed complete when desired SP is achieved for a certain number of different signature signals.

Figure 6:
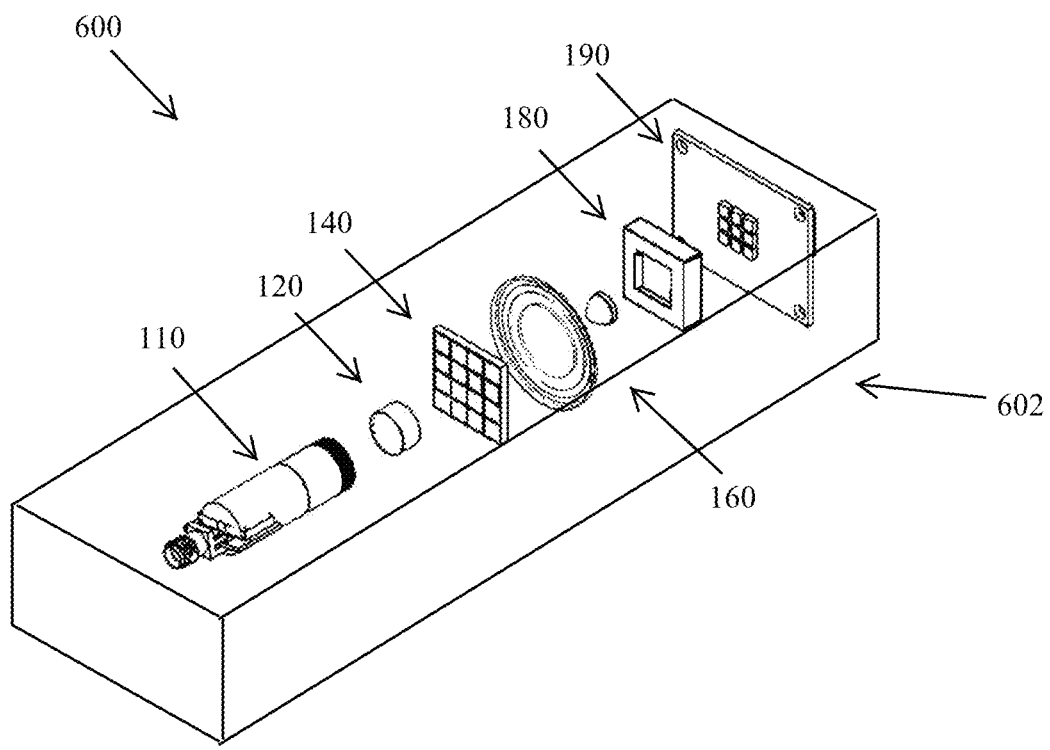
FIG. 6 is an optical reservoir computing (ORC) system having a housing of a rectangular prism shape in examples of the present disclosure.

FIG. 6 is an optical reservoir computing system 600 having a housing 602 (partially shown in transparent) of a rectangular prism shape in examples of the present disclosure. An entirety of the LED-M 110, the BE 120, the FA 140, the FKI 160, the LC-SLM 180, and the PDA 190 are enclosed by the housing 602. The optical reservoir computing system 600 is reduced to chip-scale with Multi-Chip-Module (MCM) integration. In one example, two MCM modules are integrated with FKI as a free space intersperse into a 1 cm×1 cm×6 cm "Cigar"-like package of a rectangular prism shape.

Figure 7:
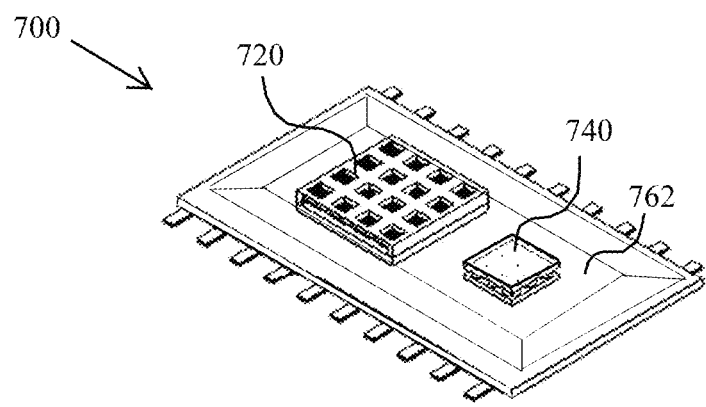
FIG. 7 is an optical reservoir computing (ORC) system in a standard electronic component package size in examples of the present disclosure.

FIG. 7 is an optical reservoir computing system 700 in a standard package size in examples of the present disclosure. A first MCM 720 comprising the LED-M, BE and FA and a second MCM 740 comprising the LC-SLM, PDA are integrated in a flat chip package with the top cover 762 serving as an optical integrator implemented in waveguides. The base of the package is an Application Specific Integrated Circuit (ASIC) which provides the functions of FPGA, processing and external communication. The whole optical reservoir computing system 700 packed in to standard dual in-line package-28 (DIP-28) package.

Those of ordinary skill in the art may recognize that modifications of the embodiments disclosed herein are possible. For example, a package size of an optical reservoir computing system may vary. Other modifications may occur to those of ordinary skill in this art, and all such modifications are deemed to fall within the purview of the present invention, as defined by the claims.

The invention claimed is:

1. An optical reservoir computing (ORC) system comprising a light emitting diode modulator (LED-M); a fluorescer array (FA); an optical integrator (OA); a liquid crystal spatial light modulator (LC-SLM); and a photo-detector array (PDA);
wherein an optical signal from the LED-M, is made incident upon the FA, is processed in the OA, multiplexed onto the LC-SLM, and converted to an set of electrical signals in the PDA.

2. The ORC system of claim 1, wherein a beam expander (BE) is placed between the LED-M and FA to facilitate optimal distribution of light intensity on the FA.

3. The ORC system of claim 1, wherein the PDA comprises a plurality of photo-diodes.

4. The ORC system of claim 1 further comprising
a field-programmable gate array (FPGA);
an electronic controller; and
a plurality of read-out channels connected to the PDA;
wherein the LC-SLM, the PDA, the FPGA, and the electronic controller form a feedback loop.

5. The ORC system of claim 1, wherein the OA is a Fresnel-Kohler integrator (FKI) comprising a Fresnel lens and a spherical lens concentrator.

6. The ORC system of claim 1, wherein the PDA includes an amplifier, and a conditioning and discriminating circuit; and wherein the FPGA outputs data to an external electronic device.

7. The ORC system of claim 1, wherein an input signal to the LED-M is a predetermined electrical signal with a frequency in a range from one kHz to ten gigahertz; wherein the LED-M comprises a near ultraviolet photodiode; and wherein the predetermined electrical signal modulates the near ultraviolet photodiode so as to generate the optical signal.

8. The ORC system of claim 7, wherein the optical signal from LED-M is a light beam with a wavelength in a range from two hundred nanometers to four hundred and fifty nanometers.

9. The ORC system of claim 1, wherein each fluorescer unit of the fluorescer array FA is characterized by a distinct emission characteristic in a spectral band in a range from fifty nanometers to four hundred nanometers and a decay time in a range from one nano-second to one milli-second.

10. The ORC system of claim 1, further comprising
a field-programmable gate array (FPGA);
an electronic controller; and
a plurality of read-out channels connected to the PDA;
wherein the LC-SLM, the PDA, the FPGA, and the electronic controller form a feedback loop; and
wherein the LC-SLM operates in a transmissive mode, and attenuation of each of a plurality of pixels is controlled by an output electrical signal from the electronic controller directed by the FPGA.

11. The ORC system of claim 1, wherein a beam expander (BE) is placed between the LED-M and FA to facilitate optimal distribution of light intensity on the FA; and
wherein the BE is a quartz concave lens.

12. The ORC system of claim 1, wherein each element of the FA is characterized by a different fluorescence time constant and different emission spectrum from other elements of the fluorescer array.

13. The ORC system of claim 1, wherein a beam expander (BE) is placed between the LED-M and FA to facilitate optimal distribution of light intensity on the FA; wherein the ORC system further comprises a housing; and wherein an entirety of the LED-M, the BE, the FA, the OA, the LC-SLM, and the PDA are enclosed by the housing.

14. The ORC system of claim 1, wherein a beam expander (BE) is placed between the LED-M and FA to facilitate optimal distribution of light intensity on the FA; wherein the ORC system is packaged in a planar electronic chip packaging; and wherein a top cover of the package serves as the optical integrator.

15. The ORC system of claim 1, wherein each element of the FA comprises a respective fluorescer dissolved in a relaxation ionic liquid.

16. The ORC system of claim 15, wherein each element of the FA is quartz and is immobilized in a UV-transparent matrix.

17. A method of training the ORC system of claim 1, wherein outputs of the PDA for input signals of interest and input representative noise are processed by the FPGA and attenuations of different pixels of the LC-SLM are performed through an electronic controller so that a resulting feedback loop provides sufficient code separation between noise and signal in the outputs of the PDA.

18. The method of training the ORC system of claim 17, wherein each pattern of signal is differentiated from noise by fixing the attenuations of different pixels of the LC-SLM.

19. The method of training the ORC system of claim 17, wherein an incoming electrical signal coming through the system is sorted by the FPGA based on the training to be recognized or discarded, based on pre-trained states of the attenuation of LC-SLM pixels.

20. A method of using the ORC system of claim 1, the method comprising the steps of providing a copy of output of the PDA to a field-programmable gate array (FPGA);
controlling the LC-SLM through an electronic controller; and
programming and training the FPGA by a computer.

21. The method of claim 20, wherein the programming and training the FPGA includes minimization of an error function of difference between a measured state of the PDA and a target state of the PDA by a regression model.

* * * * *